(12) United States Patent
Lu

(10) Patent No.: US 10,163,190 B2
(45) Date of Patent: Dec. 25, 2018

(54) SCREEN DISPLAY RATIO ADJUSTING APPARATUS AND METHOD

(71) Applicant: NANNING FUGUI PRECISION INDUSTRIAL CO. LTD., Nanning (CN)

(72) Inventor: Zong-Xian Lu, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 2 days.

(21) Appl. No.: 15/191,545

(22) Filed: Jun. 24, 2016

(65) Prior Publication Data

US 2017/0337659 A1 Nov. 23, 2017

(30) Foreign Application Priority Data

May 23, 2016 (TW) .............................. 105115982 A

(51) Int. Cl.
*G06T 3/40* (2006.01)
*H04N 19/70* (2014.01)
*G06K 7/10* (2006.01)
*G06K 7/14* (2006.01)
*G06K 9/46* (2006.01)
*G06K 9/62* (2006.01)
*G06K 19/06* (2006.01)
(Continued)

(52) U.S. Cl.
CPC ............ *G06T 3/40* (2013.01); *G06K 7/10801* (2013.01); *G06K 7/10881* (2013.01); *G06K 7/1417* (2013.01); *G06K 9/4652* (2013.01); *G06K 9/6201* (2013.01); *G06K 19/06037* (2013.01); *G06T 1/60* (2013.01); *G06T 7/0044* (2013.01); *G06T 7/408* (2013.01); *G06T 7/60* (2013.01); *H04N 5/44* (2013.01); *H04N 7/01* (2013.01); *H04N 19/70* (2014.11); *G06T 2207/30168* (2013.01)

(58) Field of Classification Search
CPC .......... G06T 3/40; G01B 11/02; G01B 11/026
USPC .................................................. 345/660, 668
See application file for complete search history.

(56) References Cited

U.S. PATENT DOCUMENTS 5,796,877 A * 8/1998 Gusmano .................. G06T 3/40
358/464
6,707,954 B1 * 3/2004 Akamatsu ................ G06K 9/46
382/286

(Continued)

FOREIGN PATENT DOCUMENTS

CN 102118498 A 7/2011
TW 201528049 7/2015

*Primary Examiner* — Phong Nguyen
(74) *Attorney, Agent, or Firm* — ScienBiziP, P.C.

(57) ABSTRACT

A screen display ratio adjusting apparatus includes a handheld device and a display device. The handheld device includes an application module which obtains an image of a pre-stored picture being displayed on a display interface of the display device ("test picture"). The pre-stored picture includes a first section and a second section. The application module calculates respective lengths and widths of the first and second sections from the test picture. The application module further calculates a display size ratio between the first section and the second section, and adjusts a display size of the first section. The display device is then configured to display the first section in an adjusted size. A screen display ratio adjusting method is also provided.

17 Claims, 6 Drawing Sheets

(51) Int. Cl.
*G06T 1/60* (2006.01)
*G06T 7/00* (2017.01)
*G06T 7/40* (2017.01)
*G06T 7/60* (2017.01)
*H04N 5/44* (2011.01)
*H04N 7/01* (2006.01)

(56) References Cited

U.S. PATENT DOCUMENTS

| | | | | |
|---|---|---|---|---|
| 7,966,044 B2* | 6/2011 | Hashimoto | ............ | G06F 3/0481 345/1.1 |
| 8,081,964 B1* | 12/2011 | Enzmann | .............. | G06F 3/1454 345/1.1 |
| 8,504,008 B1* | 8/2013 | Gossweiler, III | ............................ | H04M 1/72533 455/419 |
| 8,583,088 B2* | 11/2013 | Yoshikawa | ......... | G01C 21/3688 455/414.1 |
| 2002/0057281 A1* | 5/2002 | Moroo | .................... | G09G 5/363 345/668 |
| 2003/0174346 A1* | 9/2003 | Nagatani | .................... | G06T 3/40 358/1.2 |
| 2005/0180858 A1* | 8/2005 | Halgas, Jr. | ...... | H04N 21/440272 417/53 |
| 2009/0061841 A1* | 3/2009 | Chaudhri | .......... | H04M 1/72527 455/420 |
| 2010/0118055 A1* | 5/2010 | Nishibori | .............. | G06F 3/0346 345/666 |
| 2010/0165014 A1* | 7/2010 | Wu | ........................ | G09G 5/391 345/698 |
| 2011/0157407 A1* | 6/2011 | Lin | ......................... | G06K 9/036 348/222.1 |
| 2012/0151549 A1* | 6/2012 | Kumar | ................. | H04N 17/004 725/131 |
| 2012/0182416 A1* | 7/2012 | Kawaguchi | .......... | H04N 9/3185 348/128 |
| 2012/0287163 A1* | 11/2012 | Djavaherian | ............ | G09G 5/00 345/667 |
| 2013/0077853 A1* | 3/2013 | Chauvier | ........... | H04N 13/0022 382/154 |
| 2013/0217380 A1* | 8/2013 | Seo | ......................... | H04W 4/50 455/420 |
| 2014/0043225 A1* | 2/2014 | Lai | ............................ | G06T 3/40 345/156 |
| 2014/0075377 A1* | 3/2014 | Kang | ................. | G06F 3/04842 715/788 |
| 2014/0184473 A1* | 7/2014 | Aoki | ..................... | G06F 3/1415 345/1.3 |
| 2014/0218547 A1* | 8/2014 | Yanagidate | ......... | H04B 7/0617 348/207.1 |
| 2014/0362211 A1* | 12/2014 | Ohwaki | ............... | G01B 11/022 348/135 |
| 2015/0015852 A1* | 1/2015 | Furui | .................... | H04N 9/3194 353/69 |
| 2015/0091908 A1* | 4/2015 | Kawatani | ............ | G06F 17/5004 345/428 |
| 2015/0194134 A1* | 7/2015 | Dureau | ................. | G09G 5/373 345/660 |
| 2017/0221453 A1* | 8/2017 | Asada | ................... | G09G 5/373 |

\* cited by examiner

SCREEN DISPLAY RATIO ADJUSTING APPARATUS AND METHOD

FIELD

The subject matter herein generally relates to computer displays.

BACKGROUND

A screen display ratio adjusting apparatus and method may be used to adjust a display size within a range.

BRIEF DESCRIPTION OF THE DRAWINGS

Implementations of the present technology will now be described, by way of example only, with reference to the attached figures.

DETAILED DESCRIPTION

Figure 1:
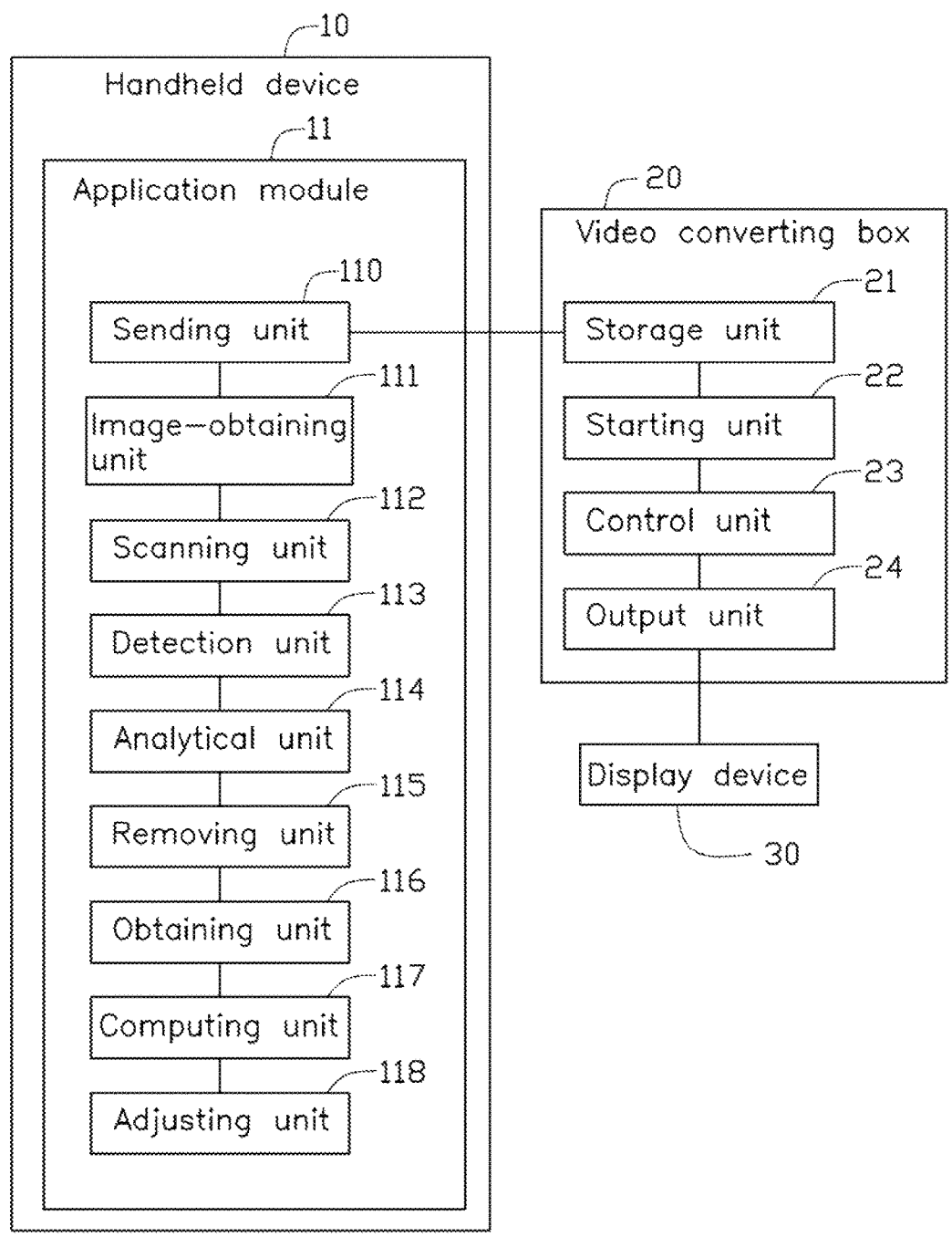
FIG. 1 is a block view of one embodiment of a screen display ratio adjusting apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

The present disclosure is described in relation to a screen display ratio adjusting apparatus and method to adjust a display size of a picture.

Figure 2:
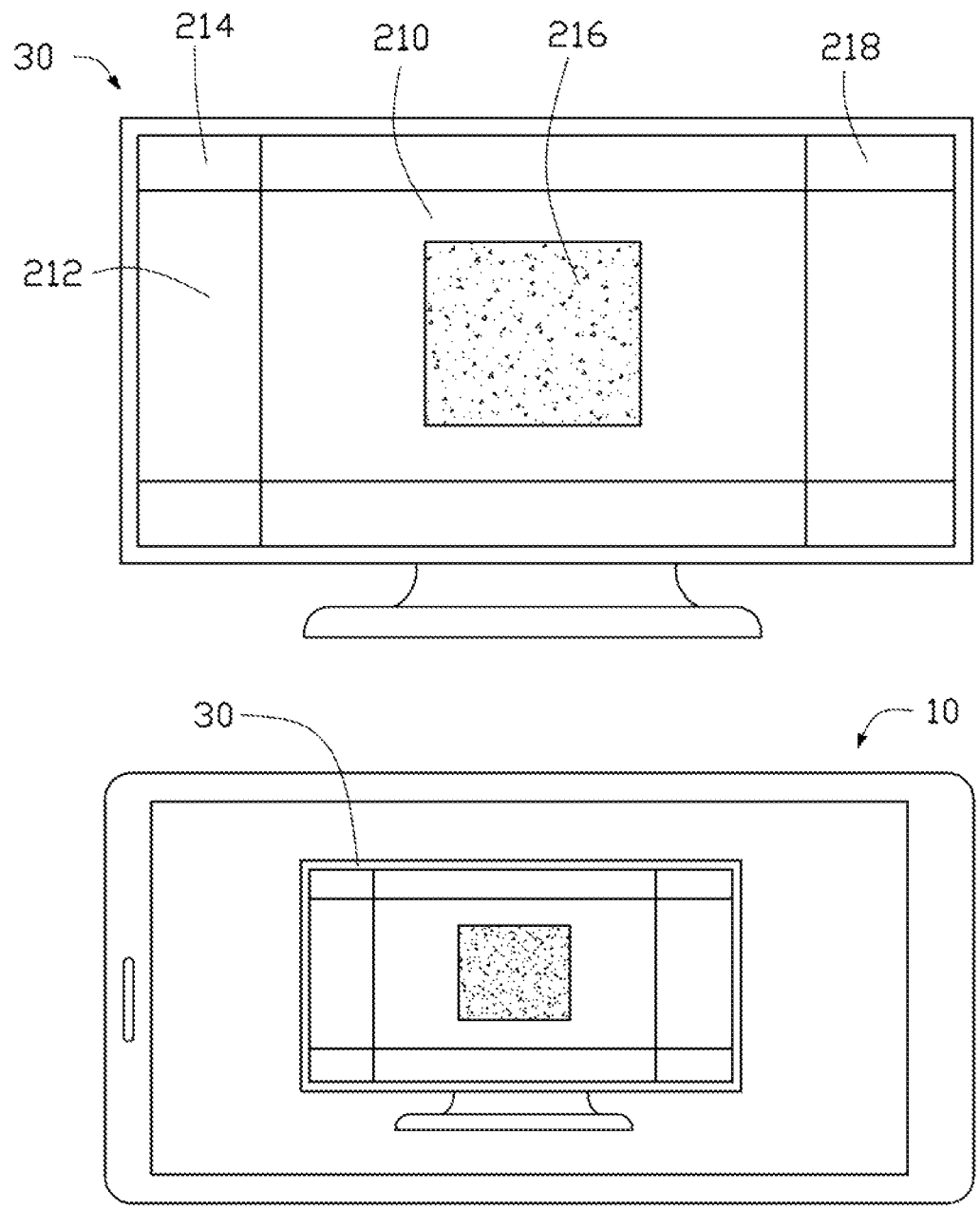
FIG. 2 is a diagrammatic view of one embodiment of a display device displaying a predetermined picture within the display ratio adjusting apparatus of FIG. 1.

FIGS. 1 and 2 illustrate an embodiment of a screen display ratio adjusting apparatus. The screen display ratio adjusting apparatus comprises a handheld device 10, a video converting box 20, and a display device 30.

In at least one embodiment, the handheld device 10 is a mobile phone, the video converting box 20 is an on the top (OTT) or set-top box, the display device 30 is a television. The handheld device 10 is capable of wirelessly communicating with the video converting box 20. The video converting box 20 is configured to communicate with the display device 30.

The display device 30 comprises a screen (not labeled). The screen is substantially square. A maximum display size of the screen comprises a length X0 and a width Y0. A minimum display size of the screen comprises a length X1 and a width Y1.

The handheld device 10 comprises an application module 11. The application module 11 comprises a sending unit 110, an image-obtaining unit 111, a scanning unit 112, a detection unit 113, an analytical unit 114, a removing unit 115, an obtaining unit 116, a computing unit 117, and an adjusting unit 118.

The video converting box 20 comprises a storage unit 21, a starting unit 22, a control unit 23, and an output unit 24. The storage unit 21 is configured to store a pre-stored picture.

The sending unit 110 is configured to send a triggering signal to the starting unit 22 after the application module 11 is started. The starting unit 22 is configured to control the control unit 23 to then start. The control unit 23 is configured to control the output unit 24 to output the stored picture to the display device 30. The stored picture is displayed on a display interface of the display device 30.

The stored picture comprises a first section 210, second section 212, and a third section 214. The first section 210 is surrounded by the second section 212. A two-dimensional code section 216 is located at a middle of the first section 210. The two-dimensional code section 216 comprises a two-dimensional bar code. The third section 214 extends from the second section 212 and comprises four areas 218. The four areas 218 are respectively located at four corners of the display interface of the display device 30. The first section 210 comprises four edges (not labeled). The second section 212 extends from the four edges. A display size of the second section 212 is substantially equal to the maximum display size of the display device 30. A display size of the first section 210 is substantially equal to 90 percent of the maximum display size of the display device 30. In at least one embodiment, the first section 210 has a first color, the second section 212 has a second color, and the third section 214 has a third color.

In at least one embodiment, the first color is blue, the second color is green, and the third color is black.

The image-obtaining unit 111 is configured to obtain an image of the display device 30 when the pre-stored picture is being displayed on the display interface of the device 30 (hereinafter "test picture"). The handheld device 10 is aligned with the display device 30 by a user before obtaining the test picture. The scanning unit 112 is configured to scan the two-dimensional code section 216 after the handheld device 10 is aligned with the display device 30. The detection unit 113 is configured to determine a photographic distance is according with a maximum distance after the scanning unit 112 scans the two-dimension code section 216. The detection unit 113 is further configured to determine the shooting distance is according with a minimum distance after the scanning unit 112 scans the third section 214. Thus, the detection unit 113 determines the shooting distance is up to standard. The image-obtaining unit 111 is configured to obtain the test picture after the detection unit 113 determines that the shooting distance is up to standard.

In at least one embodiment, the two-dimensional bar code is a quick response (QR) code.

The analytical unit 114 analyzes the first color corresponding to the first section 210 and the second color corresponding to the second section 212, thereby obtaining a first color value and first pixel position corresponding to the first color and a second color value and second pixel position corresponding to the second color.

The removing unit 115 deletes the third section 214 from the test picture. The obtaining unit 116 is configured to obtain a length and a width of the first section 210 according to the first pixel position, and configured to obtain a length and a width of the second section 212 according to the second pixel position. The computing unit 117 calculates a ratio between the first section 210 and the second section 212 according to the respective lengths and widths of the sections 210 and 212.

The adjusting unit 118 automatically adjusts the display size of the first section 210 according to the ratio after the user selects an automatic mode. If a manual adjusting mode is selected, the user can manually adjust the display size of the first section 210, according to the ratio or otherwise. If no mode is selected by the user, the automatic mode is selected.

The sending unit 110 sends the ratio to the video converting box 20 by wireless transmission. The control unit 23 adjusts the current display settings according to the ratio after the video converting box 20 receives the ratio. The control unit 23 controls the output unit 24 to send the adjusted current display settings to the display device 30. The display device 30 displays the first section 210 after receiving the adjusted current display settings.

Figure 3:
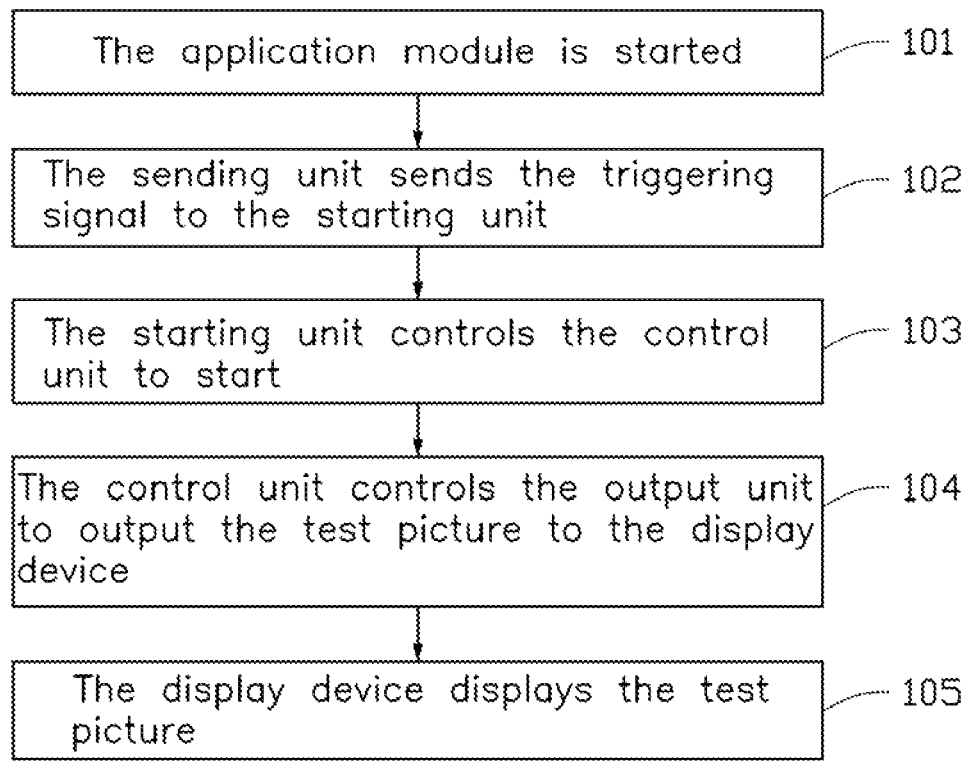
FIG. 3 is a flowchart of one embodiment of a screen display ratio adjusting method.
Figure 4:
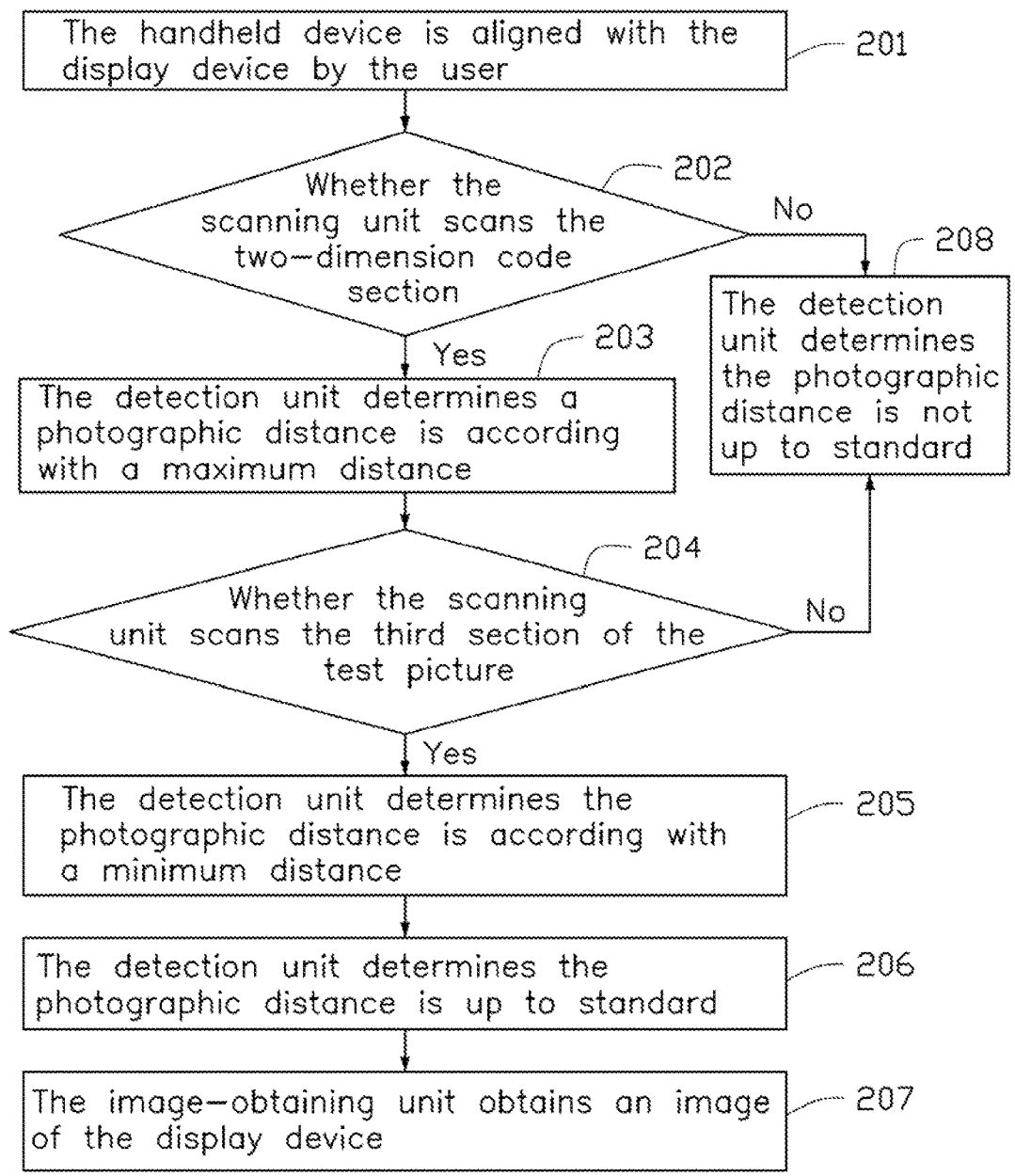
FIG. 4 is a flowchart of one embodiment of starting an application module controlling the screen display ratio adjusting method of FIG. 3.
Figure 5:
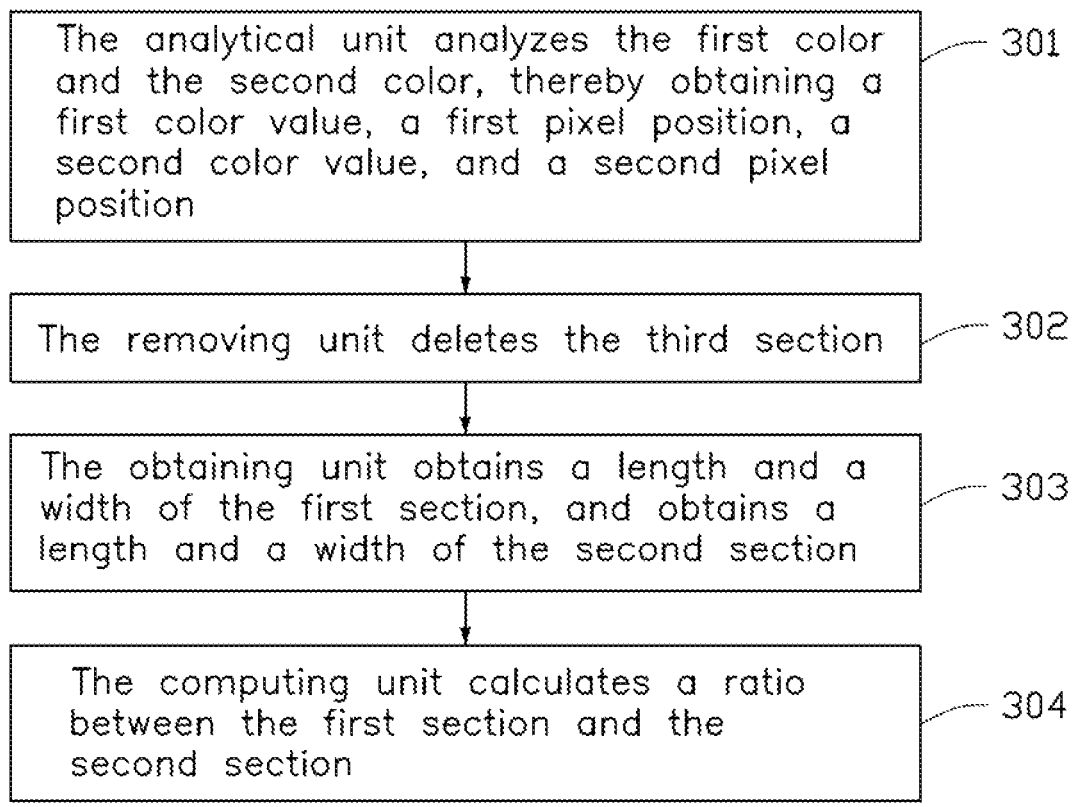
FIG. 5 is a flowchart of one embodiment of the application module determining a display ratio of the method of FIG. 3.
Figure 6:
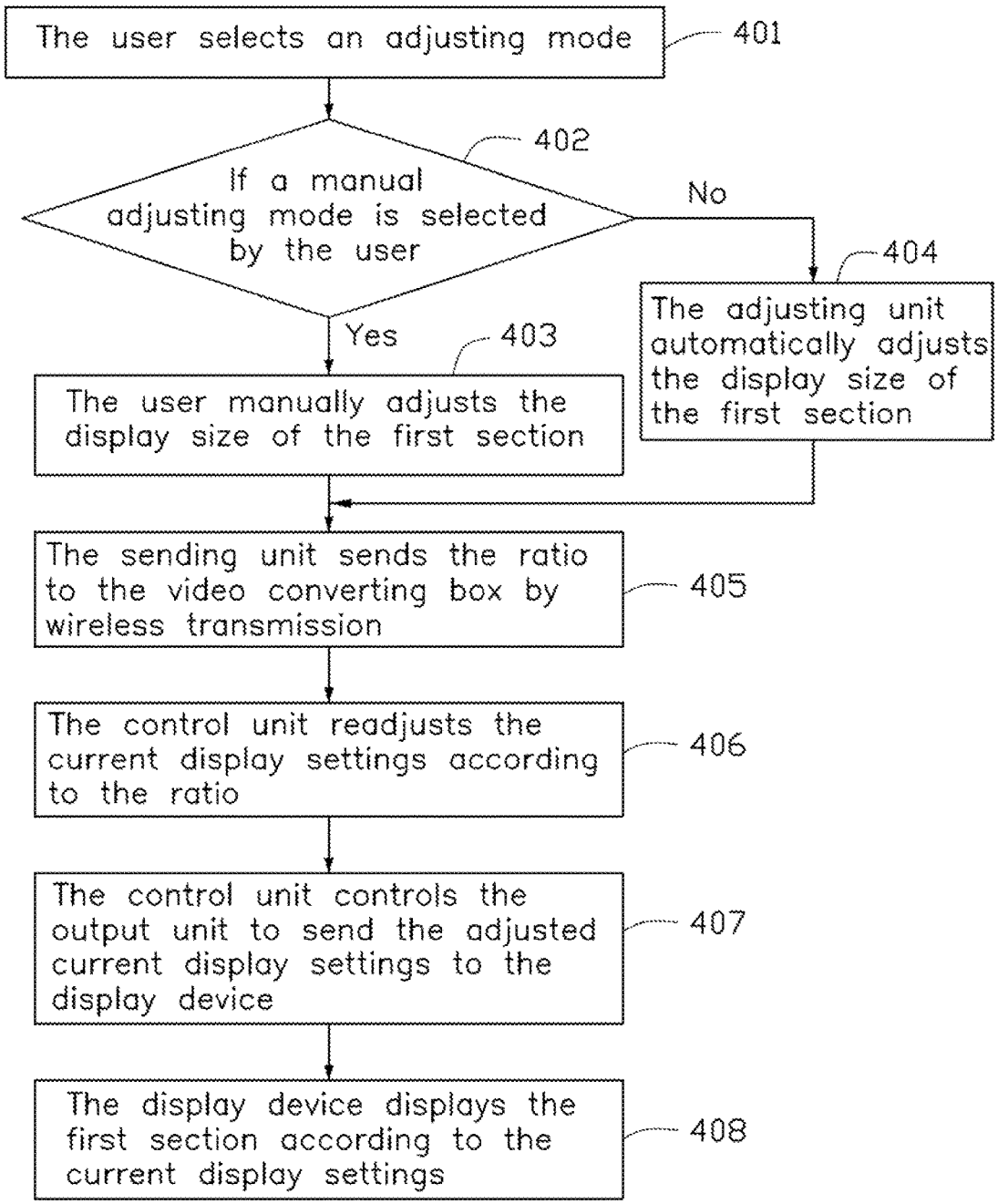
FIG. 6 is a flowchart of one embodiment of adjusting a display size within the method of FIG. 3.

FIGS. 3-5 illustrate a flowchart of a method in accordance with an example embodiment. A screen display ratio adjusting method is provided by way of example, as there are a variety of ways to carry out the method. The screen display ratio adjusting method described below can be carried out using the configurations illustrated in FIGS. 1 and 2, for example, and various elements of these figures are referenced in explaining screen display ratio adjusting method. The illustrated order of blocks is by example only and the order of the blocks can change. Additional blocks may be added or fewer blocks may be utilized without departing from this disclosure. The screen display ratio adjusting method can begin at block 101.

At block 101, the application module 11 is started.

At block 102, the sending unit 110 sends the triggering signal to the starting unit 22.

At block 103, the starting unit 22 controls the control unit 23 to start.

At block 104, the control unit 23 controls the output unit 24 to output the test picture to the display device 30.

At block 105, the display device 30 displays the test picture.

At block 201, the handheld device 10 is aligned with the display device 30 by the user.

At block 202, whether the scanning unit 112 scans the two-dimension code section 216, if yes, the method goes to block 203; if no, the method goes to block 208.

At block 203, the detection unit 113 determines the photographic distance is according with the maximum distance.

At block 204, whether the scanning unit 112 scans the third section 214 of the test picture, if yes, the method goes to block 205; if no, the method goes to block 208.

At block 205, the detection unit 113 determines the photographic distance is according with the minimum distance.

At block 206, the detection unit 113 determines the photographic distance is up to standard.

At block 207, the image-obtaining unit 111 obtains an image of the display device 30.

At block 208, the detection unit 113 determines the photographic distance is not up to standard.

At block 301, the analytical unit 114 analyzes the first color corresponding to the first section 210 and the second color corresponding to the second section 212, thereby obtaining a first color value corresponding to the first color, a first pixel position, a second color value corresponding to the second color, and a second pixel position.

At block 302, the removing unit 115 deletes the third section 214.

At block 303, the obtaining unit 116 obtains a length and a width of the first section 210 according to the first pixel position. The obtaining unit 116 obtains a length and a width of the second section 212 according to the second pixel position.

At block 304, the computing unit 117 calculates a ratio between the first section 210 and the second section 212 according to the length and the width of the first section 210 and the length and the width of the second section 212.

At block 401, the user selects an adjusting mode.

At block 402, if a manual adjusting mode is selected by the user, the method goes to block 403; if no, the method goes to block 404.

At block 403, the user manually adjusts the display size of the first section 210 according to the ratio, then the method goes to block 405.

At block 404, the automatically adjusting unit 118 adjusts the display size of the first section 210 according to the ratio, then the method goes to block 405.

At block 405, the sending unit 110 sends the ratio to the video converting box 20 by wireless transmission.

At block 406, the control unit 23 readjusts the current display settings according to the ratio.

At block 407, the control unit 23 controls the output unit 24 to send the adjusted current display settings to the display device 30.

At block 408, the display device 30 displays the first section 210 according to the current display settings.

At block 304, the ratio parameter comprises a length parameter $\theta$ and a width parameter $\sigma$, the first section 210 and the second section 212 are substantially. Each the first section 210 and the second section 212 comprises a length and a width. The length of the first section 210 is L1. The width of the first section 210 is W1. The length of the second section 212 is L2, the width of the second section 212 is W2, $\theta=L2/L1$, and $\sigma=W2/W1$.

In at least one embodiment, a basic ratio is based on the first section 210 when the ratio parameter is figured out, and a ratio value of the first section 210 is set to 1.

At block 406, the control unit 23 figures out the current display parameter according to the ratio parameter, length $X0=X1*\theta$, width $Y0=Y1*\sigma$. The control unit 23 adjusts the display range of the first section 210 according to the current display parameter.

In at least one embodiment, the handheld device 10 obtains the image of the pre-stored picture, the computing unit 117 figures out the ratio parameter, the third section 214 is removed by the removing unit 115, and the display range of first section 210 is adjusted, thus the first section 210 can be displayed on the display device 30 by a full screen mode.

It is to be understood that even though numerous characteristics and advantages have been set forth in the foregoing description of embodiments, together with details of the structures and functions of the embodiments, the disclosure is illustrative only and changes may be made in detail, including in the matters of shape, size, and arrangement of parts within the principles of the disclosure to the full extent indicated by the broad general meaning of the terms in which the appended claims are expressed.

What is claimed is:

1. A screen display ratio adjusting apparatus comprising:
   a handheld device, and
   a display device having a display interface;
   wherein the display interface displays a pre-stored picture;
   wherein the pre-stored picture comprises a first section and a second section extending outward from the first section;
   wherein the handheld device is configured to:
      obtain an image of the pre-stored picture being displayed on the display interface;
      obtain a length and a width of the first section from the image of the pre-stored picture;
      obtain a length and a width of the second section from the image of the pre-stored picture;
      calculate a ratio between the first section and the second section; and
      adjust a display size of the first section;
   wherein the pre-stored picture further comprises a third section, the third section extends from the second section, and the handheld device is further configured to determine a photographic distance is according with a minimum distance after scanning the third section;
   wherein the display device is configured to display the adjusted display size of the first section.

2. The screen display ratio adjusting apparatus of claim 1, further comprising a video converting box, wherein the converting box is configured to start after receiving a triggering signal and configured to output the pre-stored picture to the display device after starting, and the display device is configured to display the pre-stored picture after receiving the pre-stored picture.

3. The screen display ratio adjusting apparatus of claim 2, wherein the converting box is further configured to readjust current display settings according to the ratio and to send the adjusted current display settings to the display device, and the display device is configured to display the first section according to the adjusted current display settings.

4. The screen display ratio adjusting apparatus of claim 1, wherein a two-dimensional code section is located at a middle of the first section, the handheld device is configured to determine the photographic distance is according with a maximum distance after scanning the two-dimensional code section.

5. The screen display ratio adjusting apparatus of claim 4, wherein the two-dimensional code section comprises a two-dimensional bar code.

6. The screen display ratio adjusting apparatus of claim 1, wherein the handheld device is further configured to delete the third section after obtaining the length and the width of the second section.

7. The screen display ratio adjusting apparatus of claim 1, wherein the handheld device is further configured to analyze a first color of the first section and a second color of the second section after obtaining the image of the pre-stored picture, thereby obtaining a first color value, a first pixel position, a second color value, and a second pixel position.

8. The screen display ratio adjusting apparatus of claim 7, wherein the handheld device is further configured to obtain the length and the width of the first section according to the first pixel position and to obtain the length and the width of the second section according to the second pixel position.

9. The screen display ratio adjusting apparatus of claim 1, wherein the handheld device is further configured to automatically adjust the display size of the first section if no mode is selected by a user after calculating the ratio.

10. A screen display ratio adjusting apparatus comprising:
    a handheld device, and
    a display device having a display interface and configured to communicate with the handheld device;
    wherein the display interface displays a pre-stored picture;
    wherein the pre-stored picture comprises a first section and a second section extending outward from the first section;
    wherein the handheld device is configured to:
       obtain an image of the pre-stored picture, the pre-stored picture is being displayed on the display interface;
       obtain a length and a width of the first section from the image of the pre-stored picture and obtain a length and a width of the second section from the image of the pre-stored picture;
       calculate a ratio between the first section and the second section; and
       adjust a display size of the first section;
    wherein the pre-stored picture further comprises a third section, the third section extends from the second section, and the handheld device is further configured to determine a photographic distance is according with a minimum distance after scanning the third section;
    wherein the display device is configured to display the adjusted display size of the first section.

11. The screen display ratio adjusting apparatus of claim 10, further comprises a video converting box configured to wirelessly communicate with the display device.

12. The screen display ratio adjusting apparatus of claim 11, wherein the converting box is configured to start after receiving a triggering signal, and configured to output the pre-stored picture to the display device after starting, and the display device is configured to display the pre-stored picture after receiving the pre-stored picture.

13. The screen display ratio adjusting apparatus of claim 10, wherein a two-dimensional code section is located at a middle of the first section, the handheld device is configured to determine the photographic distance is according with a maximum distance after scanning the two-dimensional code section.

14. The screen display ratio adjusting apparatus of claim 10, wherein the handheld device is further configured to analyze a first color of the first section and a second color of the second section after obtaining the image of the pre-stored picture, thereby obtaining a first color value, a first pixel position, a second color value, and a second pixel position.

15. A screen display ratio adjusting method comprising:
    obtaining an image of a display device when a pre-stored picture is being displayed on a display interface of the display device;
    wherein the pre-stored picture comprises a first section and a second section extending outward from the first section;
    analyzing a first color of the first section and a second color of the second section after obtaining the image of the display device, thereby obtaining a first color value, a first pixel position, a second color value, and a second pixel position;
    obtaining a length and a width of the first section of the pre-stored picture in the obtained image of the display device, and obtaining a length and a width of the second section of the pre-stored picture in the obtained image of the display device;

calculating a ratio between the first section and the second section;

adjusting a display size of the first section automatically; and displaying the adjusted display size of the first section by the display device.

16. The screen display ratio adjusting method of claim 15, further comprising adjusting the display size of the first section automatically after no mode is selected by a user.

17. The screen display ratio adjusting method of claim 15, further comprising sending the ratio to a video converting box by wireless transmission after adjusting the display size of the first section automatically.

* * * * *